United States Patent
Mullerheim

(10) Patent No.: US 6,395,181 B1
(45) Date of Patent: May 28, 2002

(54) PROCESS AND APPARATUS FOR TREATING WASTEWATER

(75) Inventor: Steven B. Mullerheim, Berkeley, CA (US)

(73) Assignee: Great Circle Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/678,095

(22) Filed: Oct. 4, 2000

(51) Int. Cl.$^7$ .............................. B01D 21/02; C02F 1/38
(52) U.S. Cl. ...................... 210/650; 210/173; 210/192; 210/259; 210/512.1; 210/521; 210/760; 210/787; 210/801; 210/804
(58) Field of Search ................................ 210/173, 192, 210/195.2, 258, 259, 387, 400, 609, 631, 638, 650, 651, 748, 757, 758, 760, 764, 770, 780, 783, 804, 805, 806, 241, 411, 512.1, 513, 521, 787, 788, 791

(56) References Cited

U.S. PATENT DOCUMENTS

| | | | |
|---|---|---|---|
| 3,669,883 A | | 6/1972 | Huckstedt et al. |
| 3,950,249 A | * | 4/1976 | Eger et al. |
| 4,146,468 A | | 3/1979 | Wilson |
| 4,655,911 A | | 4/1987 | Tabor |
| 4,952,317 A | | 8/1990 | Culkin |
| 5,014,564 A | | 5/1991 | Culkin |
| 5,180,499 A | | 1/1993 | Hinson et al. |
| 5,188,238 A | | 2/1993 | Smisson et al. |
| 5,232,586 A | | 8/1993 | Malone |
| 5,240,600 A | * | 8/1993 | Wang et al. .................. 210/259 |
| 5,308,480 A | | 5/1994 | Hinson et al. |
| 5,445,740 A | | 8/1995 | Malone |
| 5,725,762 A | * | 3/1998 | Beal et al. .................. 210/512.1 |
| 5,807,486 A | * | 9/1998 | Busch .......................... 210/650 |
| 5,837,142 A | * | 11/1998 | Mullerheim et al. ...... 210/512.1 |
| 6,001,247 A | * | 12/1999 | Schulz ........................ 210/192 |
| 6,027,656 A | | 2/2000 | Henttonen et al. |

* cited by examiner

Primary Examiner—Joseph W. Drodge
(74) Attorney, Agent, or Firm—Fish & Richardson P.C.

(57) ABSTRACT

Wastewater can be treated using a combination of a settleable solids separator, such as a vortex separator and a membrane separation system. Removal and segregation of materials that adversely affect operation of the membrane separator earlier in the treatment process can improve water throughput, water quality and the lifespan of system components. Physical separation of settleable solids and floatable materials from the wastewater prior to treatment with a membrane separator can allow higher flow rates to be achieved.

29 Claims, 6 Drawing Sheets

PROCESS AND APPARATUS FOR TREATING WASTEWATER

TECHNICAL FIELD

This invention relates to a process and apparatus for treating wastewater.

BACKGROUND

Declining water tables, population growth, increasing industrialization, expanding use of irrigated agriculture, and pollution of fresh water supplies strain limited fresh water supplies around the world. Reclaimed wastewater can serve as a supplemental source of water, particularly for non-potable uses. Irrigation of crops and landscaping, which constitutes approximately 70% of total water demand and which also benefits from some of the nutrients present in wastewater, represents one suitable non-potable use for reclaimed water. Other appropriate non-potable applications for reclaimed wastewater include washing, cooling, fire prevention and control, creek enhancement, recreational ponds, cement preparation, dust control, and toilet flushing. Despite the wide range of non-potable uses, wastewater reclamation typically has been practiced only on a very small scale. Conveyance of reclaimed water from the reclamation site to a site of use and limited production methods can represent obstacles to more widespread use of reclaimed water.

Effective and efficient treatment of wastewater is economically and environmentally important. Wastewater treatment systems can include incineration systems, chemical treatment systems, electrolysis systems, nuclear radiation systems, and physical treatment systems. These various systems can provide water of varying quality. Many of theses systems can be costly and relatively difficult to run and maintain. Physical treatment systems such as filtration can be difficult to develop because of fouling problems and retarded flow. In addition to chemical and pathogenic impurities, incoming wastewater can include settleable solids, such as hard and abrasive materials, that can damage components of the treatment system and floatable materials, such as fats, oils, greases and fibers that can foul a physical treatment system. Useful systems for wastewater treatment can provide consistent output, be capable of automation, be relatively small in size, provide usable liquid and solid byproducts, and be relatively low in cost.

SUMMARY

In general, the invention features a process and apparatus for treating wastewater streams into beneficial water and solids components using membrane separation as a principal treatment. Removal and segregation of materials that adversely affect operation of the membrane separator earlier in the treatment process can improve water throughput, water quality and the lifespan of system components. Physical separation of settleable solids and floatable materials from the wastewater prior to treatment with a membrane separator can allow higher flow rates to be achieved.

In one aspect, the invention features a method for treating wastewater containing settleable solids to form a reusable liquid fraction. The method includes separating a wastewater stream into a first component and a second component in a first containment zone, applying the second component to a membrane permeable to selected ingredients of the second component, and concentrating the second component on a surface of the membrane to form a solids concentrate and a reusable liquid fraction. The first component includes an amount of settleable solids greater than an amount of settleable solids in the second component. The method can include comminuting the wastewater stream prior to separating the first component and the second component. High shear forces can be created between the second component and the membrane.

In certain embodiments, separating can also include settling settleable solids by forces generated by wastewater stream flow into a separation tank, by gravity, or by combinations thereof.

The reusable liquid fraction can be disinfected. This can be accomplished by, for example, exposing the reusable liquid fraction to ultraviolet radiation. In certain embodiments, disinfecting can include mixing a chemical oxidant, such as ozone, with the reusable liquid fraction.

The reusable liquid fraction can be applied to unsaturated soil. The soil can assist in removal and productive reuse of plant nutrients contained in the reusable liquid fraction, and return purified water to underlying aquifers.

The method can include removing the solids concentrate from the membrane as a slurry fraction and returning the slurry fraction to the wastewater stream. The method can include passing the reusable liquid fraction through a filter system either prior to or following membrane separation. The filter system can be backflushed, for example, to create a volume of backflushed material and that can be combined with the slurry fraction. The filter system can include a fixed-film biofilter. Contact with the film of the biofilter can result in removal of remaining suspended solids, nitrification of dissolved and suspended nitrogen compounds, and reduction of other sources of biochemical oxygen demand. The biofilter can be backflushable.

The wastewater can be obtained from a sewer. The first component and the froth fraction can be combined to form a slurry stream that can be returned to the sewer downstream of the location from which the wastewater was obtained. In certain embodiments, the slurry stream can be passed into a third containment zone to separate it into a supernatant fraction and a settled fraction. Sufficient retention time in the third containment zone can allow for substantial settling of settleable solids to the bottom of the zone. In the third containment zone, solids can be decomposed by a predominantly anoxic biological process. The supernatant fraction can be returned to the first containment zone or the second containment zone, or passed to an underground leach field.

In another aspect, the invention features an apparatus for treating wastewater containing settleable solids. The apparatus includes a settleable solids separator, which includes a vessel having an upper end, a lower end, and an outer wall connecting the upper end and the lower end. The settleable solids separator also includes an inlet directed partially tangentially through the outer wall of the vessel, a first outlet proximate to the upper end of the vessel, and a second outlet proximate to the lower end of the vessel. The apparatus also includes a membrane separation system having an inlet and a permeate outlet. The inlet and the permeate outlet are separated by a membrane. A fluid conduit fluidly connects the first outlet of the settleable solids separator and the inlet of the membrane separation system. The membrane separation system can also include a concentrate port. Motive pressure applied to the membrane separation system inlet can be provided by a feed pump in fluid communication with the inlet.

The settleable solids separator can be a vortex separator. The settleable solids separator can also include a vent and overflow port positioned between the first outlet and the upper end of the vessel. The second outlet of the settleable solids separator can be a settled solids outlet in communication with an opening in the base of the vessel for removing solids, which are swept towards the opening by a vortex.

In certain embodiments, an equalization vessel, that can have an upper end, a lower end, and an outer wall connecting the upper and lower end, can be included between the first outlet of the settleable solids separator and the inlet of the membrane separation system. The vessel can also include a scum overflow and vent port between the normal liquid level of the vessel and the upper end. The inlet of the equalization vessel can be below the first outlet of the separator. The outlet port of the equalization vessel can be at the lower end.

The membrane separator system feed pump can receive as input clarified wastewater provided either directly from the first outlet of the settleable solids separator, or in certain embodiments, from the outlet port of an equalization vessel. The apparatus can also include a filter system, which has an inlet and a filtrate outlet, with the inlet in fluid communication with the feed pump, and the filtrate outlet in fluid communication with the membrane separation system feed inlet. The filter system can be a backflushable filter system, a fixed-film biofilter system, or a backflushable fixed-film biofilter system. The backflushable filter can include filter disks.

A permeate conduit can fluidly connect the permeate outlet of the membrane separation system with a disinfection system, which can include an ultraviolet disinfection system or an ozone treatment system, or both. The ozone treatment system can include a closed ozone treatment vessel having an ozone injection region in fluid communication with a permeate flowing region. An ozone transport conduit can fluidly connect a closed atmosphere of the settleable solids separator and the closed ozone treatment vessel.

The ultraviolet disinfection system can include one or more clear plastic tubes that are transparent to ultraviolet radiation and through which the reusable liquid fraction passes, ultraviolet lamps surrounding the plastic tubes, and an enclosure containing the assembly of tubes and lamps. The ultraviolet lamp apparatus can produce ozone in the air space surrounding the lamps. The ozone can be extracted from the enclosure, which can serve as an ozone generator. An ozone transport conduit can fluidly connect a closed atmosphere of the settleable solids separator and a closed ozone treatment vessel of the ozone treatment system. Exposure to ultraviolet radiation can directly kill organisms, and if dissolved ozone is contained in the liquid, it can create powerful oxidizing agents that further disinfect, remove odor and color, reduce biochemical oxygen demand of, and oxidize harmful chemical compounds in the liquid.

The apparatus can include a wastewater pump, such as a comminuting wastewater pump in fluid communication with the inlet of the settleable solids separator.

The apparatus can also include a flow restrictor in fluid communication with the concentrate outlet port of the membrane separation system. The flow restrictor can be used to regulate the flow of the process. Periodically, the flow restrictor can be used to retard flow so as to cause the liquid levels of both the vessel of the settleable solids separator and the equalization vessel to rise beyond the overflow ports of both vessels, thereby forcing accumulated scum layer and other floating material on the surface of the vessels to be discharged into the slurry fraction via a scum overflow and vent port that can be in fluid communication with a slurry fraction conduit. The slurry fraction conduit can be in fluid communication with the second outlet of the settleable solids separator. The outlet of the flow restrictor can be in fluid communication with either the settleable solids separator vessel or an equalization vessel.

In particular embodiments, the apparatus can include a solids treatment system. The solids treatment system can include an inlet port and an outlet port. The inlet port can be in fluid communication with the slurry fraction conduit. The solids treatment system can include a vessel with an inlet port in communication with the slurry stream, and an outlet port. The solids treatment system can have a volume sufficient to allow the settleable solids in the slurry stream an opportunity to settle and decompose by, for example, predominantly anoxic biological processes. The outlet port of the solids treatment system can be in fluid communication with the inlet of the settleable solids separator. The outlet port of the solids treatment system can be in fluid communication with the inlet of the gravity separator vessel.

In another aspect, the invention features an apparatus for treating wastewater containing settleable solids. The apparatus includes a vortex separator and an ozone treatment system. The vortex separator includes a closed separator vessel having an upper end, a lower end, and an outer wall connecting the upper end and the lower end, an inlet directed partially tangentially through the outer wall near the upper end of the vessel, a first outlet proximate to the upper end of the vessel, and a second outlet proximate to the lower end of the vessel. The ozone treatment system includes a closed ozone treatment vessel having a fluid inlet and an ozone injection region in fluid communication with a fluid flowing region. A fluid conduit fluidly connects the first outlet of the vortex separator to the fluid inlet of the ozone treatment system, and the closed separator vessel and the closed ozone treatment vessel are fluidly connected by an ozone transport conduit.

The method offers a simple, reliable, rapid, compact and inexpensive process for obtaining reusable water, which can overcome many of the deficiencies of conventional biological wastewater treatment processes. For example, the apparatus and method performs more reliably and efficiently than paper filter, membrane, or biological systems alone. The apparatus is a complete wastewater reclamation system that, among other things, can minimize conveyance costs, can avoid the use of inherently unreliable and maintenance-intensive wastewater treatments, can overcome certain limitations of past physical or chemical systems, can produce reusable or readily disposed residual byproducts, can be compact, economical, reliable, and odorless, and can produce high quality thoroughly disinfected water appropriate to various reuse applications, such as irrigation and other non-critical reuse applications, washing, cooling and other industrial uses, or aquaculture and for discharge to surface water bodies. The method an apparatus can also create an odorless environment in the surrounding of the apparatus. Accordingly, the wastewater reclamation system can be well suited for on-site or local applications in which the water produced is reused productively in the vicinity of the treatment plant.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
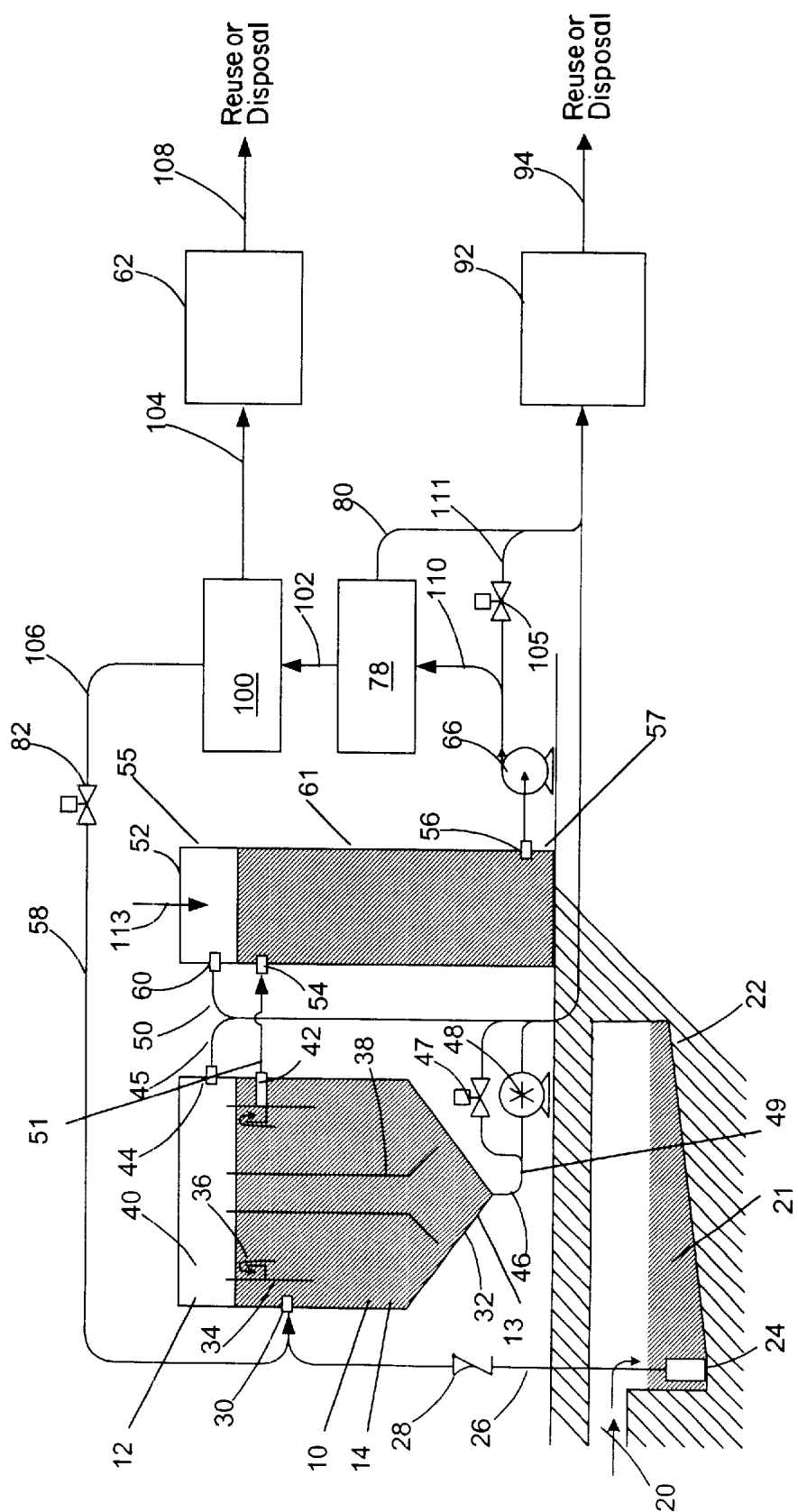
FIG. 1 is a schematic view of a water reclamation system including a solids treatment system.
Figure 2:
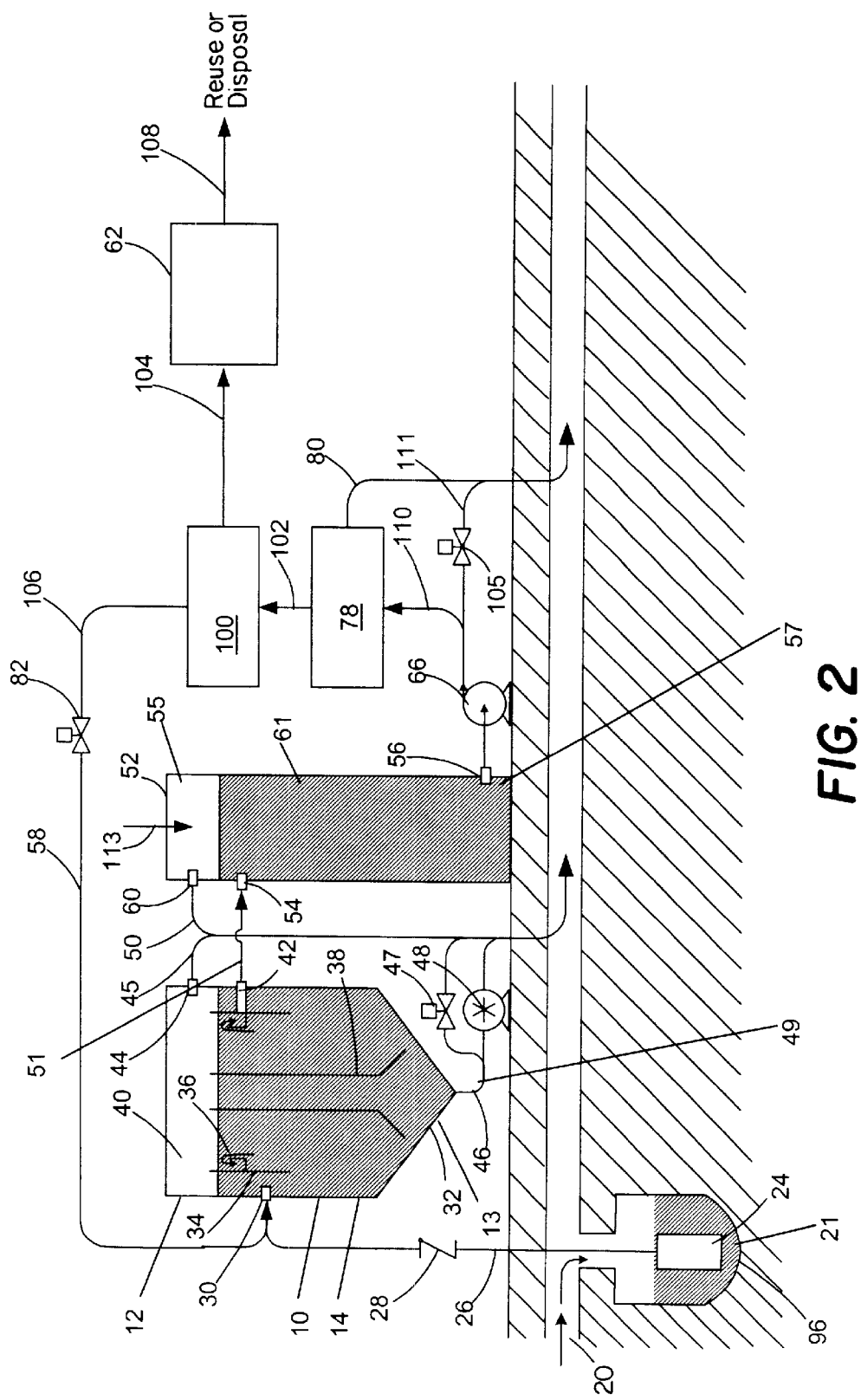
FIG. 2 is a schematic view of a water reclamation system including a return for carrying solid residuals to a sewer.

Referring to FIGS. 1–2, a water reclamation system includes settleable solids separator 32, such as a vortex separator, equalization and cleaning-in-place vessel 52, filter system 78, such as a backflushable filter system, membrane separation system 100, a permeate treatment system 62, and solids treatment system 92 (FIG. 1) or sewer 20 (FIG. 2). Wastewater 21, which can contain sanitary and other wastes, collects in underground storage tank 22 (FIG. 1) or wet well 96 (FIG. 2). Underground tank 22, or wet well 96, contains submersible sewage pump 24. Preferably, pump 24 is a comminuting pump, such as a chopper pump manufactured by Vaughan Chopper Pumps of Montesano, Wash., which simultaneously chops, or comminutes, larger solids in wastewater 21 into a slurry. The slurry is pumped via conduit 26, through check valve 28 and into settleable solids separator 32 through inlet port 30 of settleable solids separator 32.

Settleable solids separator 32 includes vessel 10 having upper end 12 connected to lower end 13 by outer wall 14. First outlet 42 is located in outer wall 14 near upper end 12. Inlet port 30 is directed partially tangentially through outer wall 14 near upper end 12. Second outlet 46 is proximate to lower end 13. Closed atmosphere 40 of separator 32 fluidly communicates with vent and scum overflow port 44 connected to vent and scum overflow conduit 45. Lower end 13 includes second outlet 46, which is connected to conduit 49 which includes solids pump 48. Solids pump 48 can be, for example, a progressing cavity pump available from Monyo Inc. of Springfield, Ohio. Referring to FIG. 1, solids pump 48 and drain valve 47 empty through conduit 45 into solids treatment system 92, which discharges treated material through output port 94. Referring to FIG. 2, solids pump 48 and drain valve 47 empty through conduit 45 into sewer 20.

Figure 3:
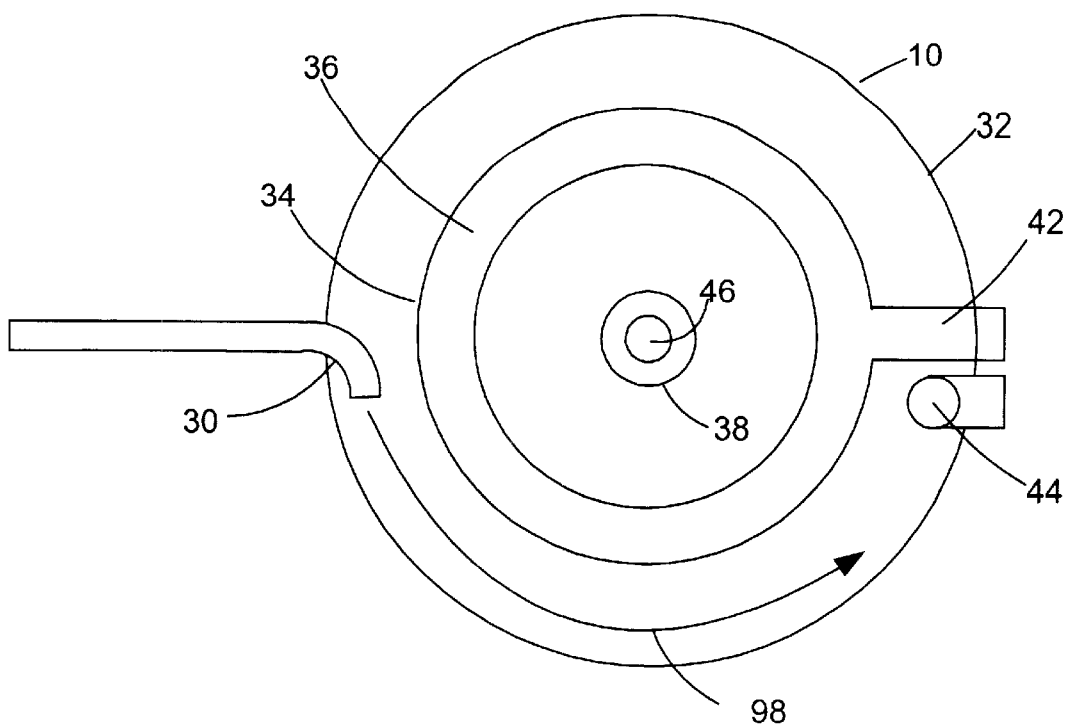
FIG. 3 is a plan view of a separation tank.

Referring to FIG. 3, inlet 30 of separator 32 is directed to create centrifuigal flow pattern 98 that passes around annular dip plate 34, spillway 36, and the top of baffle 38. Spillway 36 is attached to the inner wall of dip plate 34. First outlet 42 draws fluid from spillway 36. Vent and scum overflow port 44 is located to one side of separator 32. Second outlet 46 is centered in vessel 10. Annular inner baffle 38, which flares out in a conical shape as it, approaches second outlet 46.

Figure 4:
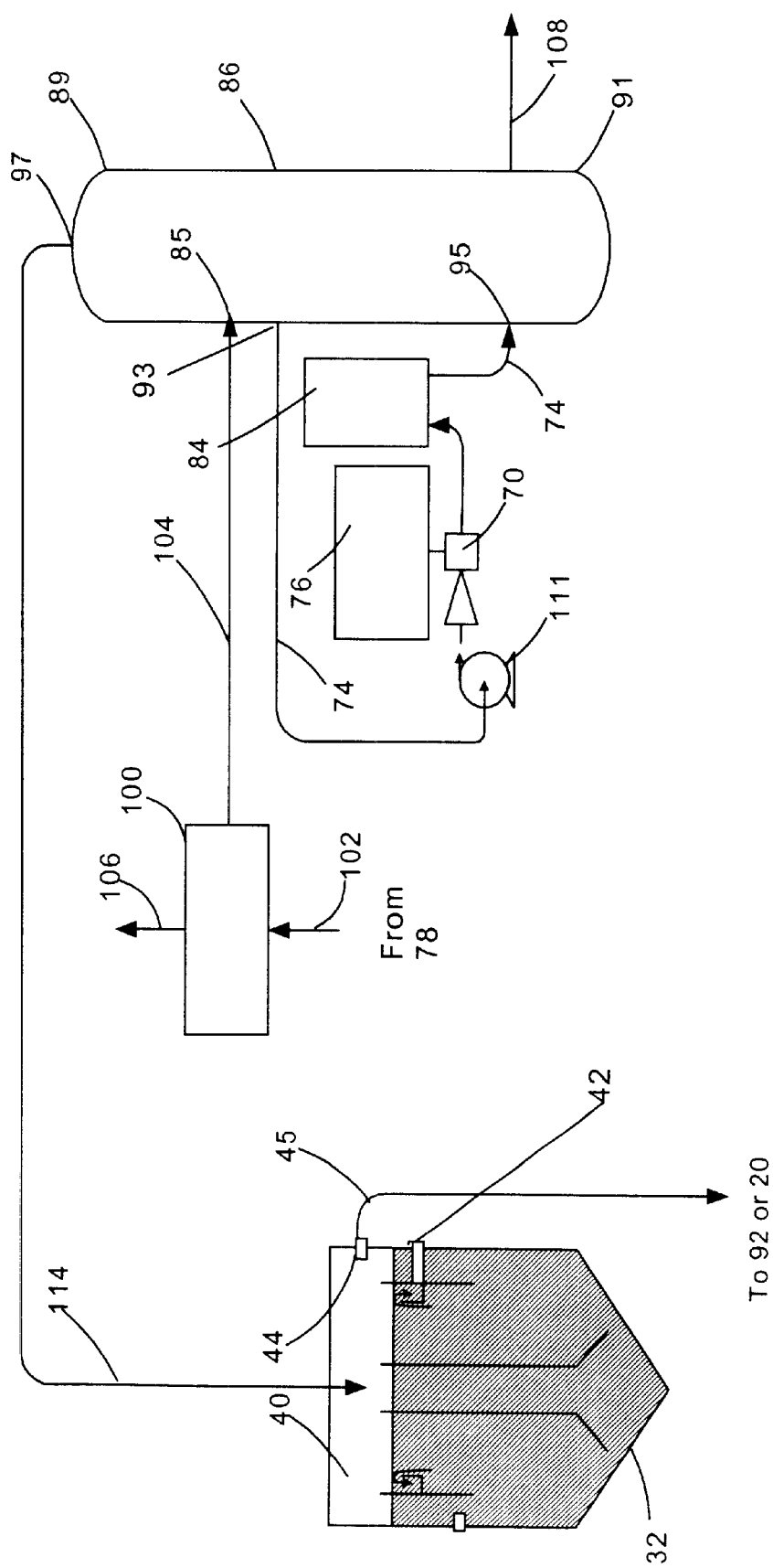
FIG. 4 is a schematic view of a water reclamation system including an ozone treatment system.

Referring to FIGS. 1–3, first outlet 42 delivers the contents of spillway 36 to gas floatation separation system 52 via fluid conduit 51. Referring to FIGS. 1–2 and 4, equalization and cleaning-in-place vessel 52 receives output of settleable solids separator 32 through inlet port 54. Inlet port 54 is proximate to upper end 55 of vessel 52. Vessel 52 has reusable liquid fraction outlet port 56 below inlet port 54 and proximate to lower end 57. Scum overflow and vent port 60 is positioned toward upper end 55 of vessel 52 above the normal liquid level of vessel 52, draining to conduit 50. Outer wall 61 connect end 57 and end 55.

Outlet port 56 is fluidly connected to feed pump 66. Outlet port 56 is part of a circuit passing through conduit 110 to filter system 78, and through feed conduit 102 to membrane separation system 100. Suitable membrane separation systems are available from Komline-Sanderson of Peapack, N.J. and New Logic International of Emeryville, Calif. and are described, for example, in U.S. Pat. Nos. 6,027,656, 4,952,317, 5,014,564 and 5,837,142, each of which is incorporated herein by reference. Concentrate output from membrane separation system 100 passes through concentrate conduit 106, flow control valve 82, return conduit 58, and inlet port 30 of settleable solids separator 32. Permeate from the permeate outlet of membrane separation system 100 passes through conduit 104 to permeate treatment system 62. A side stream from feed pump 66 passes through drain valve 105 and conduit 111 to join conduit 80. When necessary, cleaning solution can be supplied to equalization and cleaning-in-place vessel 52 through conduit 113. Reusable liquid fraction is discharged from outlet 108. The separating characteristics of membrane separation system 100 can be used more efficiently because most of the settled and floating solids of the wastewater have been removed by settleable solids separator 32.

Referring to FIG. 2, residual solids are returned to sewer 20. Wastewater 21 from sewer 20 drains into a wet well 96, which is at an elevation lower than that of sewer 20. Rather than employ a separate solids treatment system, settled solids from pump 48, foam, gas and floatable solids from conduits 45 and 50 and filter backflush from conduit 80 drain back to sewer 20 at points downstream of the entrance to wet well 96.

Figure 5:
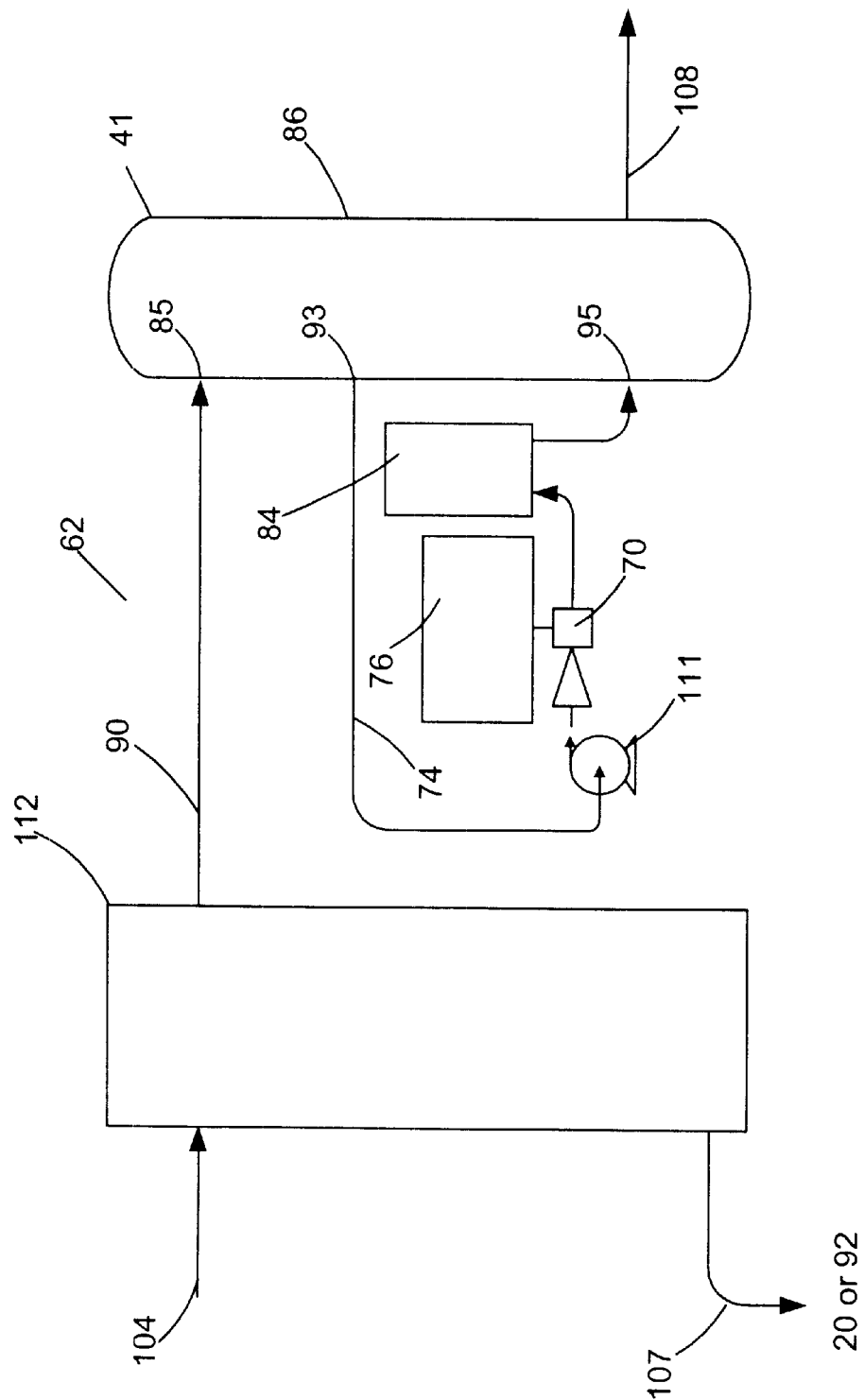
FIG. 5 is a schematic view of a permeate treatment system.

Referring to FIGS. 4 and 5, permeate outlet conduit 104 of membrane separation system 100 feeds permeate to ozone contacting vessel 86 through inlet port 85. Vessel 86 is closed with permeate inlet 85 proximate to upper end 89, a reusable liquid fraction outlet 108 proximate to lower end 91. Vessel 86 includes circulation outlet 93, located somewhat below inlet 85, circulation inlet 95 somewhat above reusable liquid fraction outlet 108, and a foam and ozone outlet 97 proximate to the upper end of 97 and above a normal operating liquid level of the vessel. Circulation outlet 93 is part of a circuit feeding back to circulation inlet 95 through conduit 74, circulation pump 111, gas injector nozzle 70, ultraviolet disinfection system 84 and conduit 74. Ozone gas is supplied to gas injector nozzle 70 by ozone generator 76. Referring to FIG. 4, foam and surplus ozone gas from outlet port 97 can be transmitted via conduit 114 to airspace 40 of settleable solids separator 32. Referring to FIG. 5, system 62 includes backflushable biofilter system 112 that can be inserted between permeate conduit 104 and ozone contacting vessel 86. When biofilter system 112 is present, the reusable liquid fraction can be used in applications such as aquaculture or discharge to surface water bodies where it can be important that the nitrogen compounds in the water be nitrified and have a low biochemical oxygen demand. For aquaculture use, the rapid treatment process can preserve heat in the water. Suitable backflushable biofilter systems are described in U.S. Pat. Nos. 5,232,586 and 5,445,740, which are incorporated herein by reference, and include the Bubble Washed Bead Filters and Propeller Washed Bead Filters manufactured by Aquaculture Systems Technologies L.L.C. of Jefferson, La. Biofilter system 112 can be backflushed through conduit 107 into sewer 20 or treatment system 92. Backflushing of biofilter systems can be accomplished using gravity with compressed air or a motorized propeller to agitate the filter medium and to loosen accumulated material. The frequency of backflushing for the biofilter system can be carried out at a regular operational interval, or can be triggered by an increase in feed backpressure.

In operation of the systems of FIGS. 1–3, wastewater 21 entering underground tank 22 or well 96 is pumped via pump 24 through check valve 28 into settleable solids separator 32 through port 30, where flow is directed tangentially to wall 14, thereby causing the contents of the separator to slowly circulate. Floatable substances, such as fats, oils and greases, in the wastewater quickly rise along the tank periphery as the contents of the separator circulate, causing them to become trapped predominantly in the annular space between dip plate 34 and wall 14. Settleable solids, such as grit, sand, stones, razor blades, plastics, and other foreign solid materials, in the wastewater fall to the bottom of separator 32 by circulating along the outer periphery of the separator. As the settleable solids reach the bottom of the separator, they are swept inward by centripetal forces created by the differential velocities of the circulating fluid on the outside of the baffle and the relatively stationary liquid toward the center. Solids reaching the outer inclined surface of baffle 38 gradually slide downward and out onto the conical bottom surface of the tank. Centripetal forces created by the relatively quiescent conditions under baffle 38 sweep settled solids inward and trap them under the baffle. Once trapped inside the baffle, suspended solids slowly agglomerate and settle to the bottom. The settled solids exit the separator through outlet 46. Liquid relatively free of settleable and floatable solids and containing primarily dissolved and suspended solids rises toward the top of the separator inside of annular dip plate 36, exiting the separator through spillway 36 and port 42. The component exiting through port 46 contains a greater amount of settleable solids than the component exiting through port 42.

The fluid component exiting port 42 enters equalization and cleaning-in-place vessel 52 at inlet 54 and is pumped out of vessel 52 by pump 66 through outlet 56 to conduit 110 into filter system 78. After filter system 78, the fluid passes through conduit 102 into membrane separation system 100. Within membrane separation system 100, a portion of the fluid passes through a membrane and is output as permeate to conduit 104, while the remainder of the fluid exits system 100 as concentrate through conduit 106.

Flow control valve 82, sewage pump 24, circulation pump 66, and settled solids pump 48, work in a coordinated manner to control fluid flow rates in the overall system. Under ordinary operating conditions, valve 82 typically is set to match the flow rates into the system through pump 24 so that the liquid levels in vessels 10 and 52 remain stable. One way to control flow rates through valve 82 is by interconnecting it with a float pilot valve in vessel 52, such as is provided by the model 700-60 float-controlled valve system available from Bermad Control Valves of Anaheim, Calif. Flow is increased through the membrane separation system by increasing feed pressure, which can be altered by restricting the flow through valve 82.

A permeate fraction exits conduit 104 substantially free of suspended, settleable and floatable solids. Various subsequent treatments can be provided by permeate treatment system 62, which will differ depending on the end use intended for the reusable liquid fraction produced.

Filter system 78 removes larger particles that could damage the membranes of membrane separation system 100, or diminish the flow rates achievable by the system. Several types of filter systems can be selected for filter system 78. One preferred system is a backflushable filter system that uses a plurality of disk filters, such as disk filtration systems manufactured by Arkal Filtration Systems of Kibbutz Bet Zera, Jordan Valley, Israel, which are capable of filtering out materials as small as 10 microns, provide continuous flow using a plurality of filter modules. Suitable filter systems are described in U.S. Pat. No. 4,655,911, which is incorporated herein by reference. In the system depicted in FIG. 1, a filter porosity of 200 microns or less is desirable to remove particulate materials of concern. The backflushable filter system can use a simple and reliable backflush method that backflushes one filter module at a time, while the modules not being backflushed continue to be available to filter water. An air-assisted backflushing step can produce a low volume of backflush, which can decrease the backflush output of the system. The backflushable filter system can employ an automatic backflush cycle that is triggered when the pressure differential across the component filters exceeds a predetermined value.

Over time, suspended and dissolved solids in vessel 52 can become increasingly concentrated, which can foul the membrane of system 100. Fouling of the membrane can result in higher feed pressure when the permeate flow rate is maintained. When higher pressures are detected by an external control system, a cleaning cycle can be initiated after a predetermined pressure threshold is reached. During the cleaning cycle, the following sequence can be followed: (1) flow to vessel 52 through inlet port 54 is stopped by shutting off pump 24; (2) vessel 52 is purged by opening drain valve 105, and closing valve 82; (3) vessel 52 is filled with a cleaning solution, such as, for example, a combination of hot water and lye through input 113; (4) valve 82 is opened and 105 is closed; (5) the cleaning solution is passed for a period of time through membrane separation system 100, with a fraction thereof exiting as permeate and disposed; and (6) valve 82 is closed and valve 105 is opened, causing the cleaning solution to be pumped out of tank 52 through valve 105, conduit 111 and into sewer 20. Following the cleaning cycle, the startup sequence can be initiated by closing valve 105 and turning on pump 24 to cause new fluid to be admitted to tank 52 through inlet 54.

During operation of the system, scum layers will develop on the surfaces of the liquid in both vessels 32 and 52. Scum layers can be purged from the system by periodically closing valve 82 for an interval while leaving input pump 24 running. This causes the liquid levels in both vessels 10 and 52 to rise, and eventually spill over through ports 44 and 60 through conduits 45 and 50 into solids treatment system 92 (FIG. 1) or sewer 20 (FIG. 2). Once the scum layers have been purged, valve 82 can be opened again to modulate flow by valve 82 to return the liquid level in tank 52 to the target level.

Settled solids pump 48 is turned on and off periodically in coordination with the total flow through the system to meter out controlled amounts of solids residuals to solids treatment system 92 (FIG. 1) or sewer 20 (FIG. 2). For the embodiment FIG. 1, the solids are concentrated to a high degree prior to treatment, in the range of 5% solids by weight, to minimize the volumes in need of subsequent treatment. The higher solids contents can be achieved by metering the solids residuals using pump 48. Normally drain valve 47 is closed, but it can be opened to drain tank 32 quickly.

The return of concentrate to settleable solids separator 32 can take advantage of kinetic energy remaining in the concentrate stream to assist in maintaining flow, such as centrifugal flow, in vessel 10, and thereby improving separation efficiency. This centrifugal action can be maintained even after sewage pump 24 is turned off, thereby helping to confine solids in vessel 10 to the conical-bottomed center section while vessels 52 and 10 are emptying.

In operation of the permeate treatment system of FIGS. 4 and 5, permeate contained in ozone contacting vessel 86 is circulated through gas injector 70 and ultraviolet disinfection system 84, during which time permeate is injected with ozone and subjected to ultraviolet radiation. Ozone gas is carried by the circulating stream into contacting vessel 86 where it rises, contacting new permeate traveling slowly in a counter direction from inlet 85 to outlet 108. The downward flow of liquid from inlet 85 to outlet 108 opposes the upward flow of bubbles, increasing the duration and extent of liquid-bubble contact. Small ozone bubbles contacting the permeate can oxidize substances in the permeate, thereby disinfecting it, while also removing odor and color. Ultraviolet radiation further disinfects the permeate with direct germicidal radiation, while interaction of the radiation with dissolved ozone creates hydrogen peroxide and free radicals which further disinfect, remove odor and color, and oxidize undesirable dissolved organic substances such as are found in herbicides and insecticides.

Settleable solids separator 32 and equalization and cleaning-in-place vessel 52 both can have closed atmospheres. This prevents release of odorous gases to the environment surrounding the system. Additional odor control can be provided by surplus ozone released under pressure to airspace 40 of vessel 10. This ozone can also permeate interconnecting conduits and solids treatment system 92. This ozone-containing atmosphere can further reduce odors by, for example, oxidizing $H_2S$, mercaptans, and other malodorous or harmful gases in the airspaces. The chemical reactions with the ozone not only deodorizes and destroys these materials, but also consumes excess ozone. The reusable liquid fraction generated by the system can be substantially clear, odorless, colorless, disinfected, and free of suspended solids. The reusable water recovered using the system depicted in FIG. 1 can have beneficial attributes for irrigation, washing and cooling uses. For example, the water can contain organic forms of desirable plant nutrients, including trace minerals and nitrogen in forms such as ammonia, which can then be captured by soil particles and converted slowly into nitrates usable by plants. In addition, the reusable water can contain detergents, which can render heavy clay soils more porous, and hydrogen peroxide created by ozone injection, which can improve the health and activity of plant roots.

The treatment process can be relatively rapid. The size of the system can be determined, in part, by the dimensions of vessels 10 and 52, which can be taller than they are wide, and have relatively small volume. Typical water retention times are approximately 15 minutes in vessel 10, and 10 minutes in vessel 52. In comparison, biological treatment systems can have hydraulic retention times between 4 hours and several days. Wastewater can be treated in approximately 30 minutes in surface tanks, which can preserve the heat value of the wastewater, which can be supplemented by the pumping energy added by the equipment. Since municipal wastewater typically has a temperature of 65–70° F., the heat can be released in greenhouses during cold months. In addition, because the systems of FIG. 1–2 and 4 use physical separation methods, intermittent use of the system can be facilitated, for example, when there is need for the water. Systems that use biological purification methods can require more stable operating conditions than physical systems.

The system depicted in FIG. 2 can be compact, having a very small footprint, rendering it very practical for potential deployment in developed areas where land is scarce and land prices are high. In addition, because the solids are returned to the sewer, there is a decreased need to concentrate solids to a high degree. Accordingly, pump 48 can be operated with a higher duty cycle than in the system of FIG. 1.

The compact nature of the system, and the low odor and noise emissions of the system, allow it to be sited close to populated areas. As long as there are sewers nearby, the system can be sited near a location where the recycled water is needed, such as, for example, in an urban park or a golf course. The attributes of the system allow lower cost and more practical wastewater reclamation to be achieved.

Figure 6:
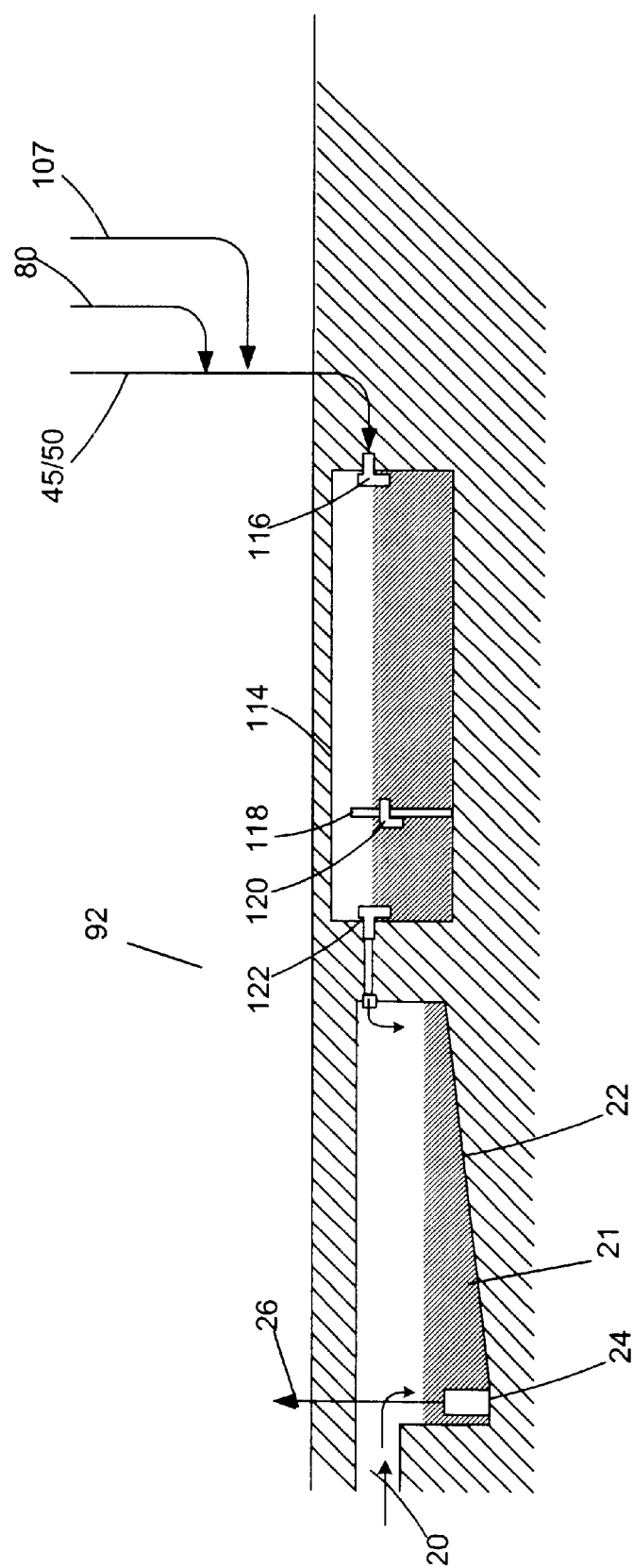
FIG. 6 is a schematic view of a solids treatment system.

Referring to FIG. 6, solids treatment system 92 includes underground tank 114, which can resemble a septic tank for treatment of residential wastewater. Tank 114 has an inlet port 116, baffle 118 and conduit 120 between two containment zones of the tank, and outlet port 122. Inlet port 116 receives by gravity settled solids, gases, foam, and floatable solids collected in other parts of the system from conduits 45 and 50 and the filter backflush of conduit 80. Output of tank 114 is conveyed through port 122 back to tank 22.

Operation of solids treatment system 92 can be similar to that of a septic tank. The system can operate as an unheated, unmixed anaerobic digester. By design, solids concentrations of the influent can be up to 50 to 100 times greater than that in a typical septic tank for a single family home. As a result, the retention times in the tank can be increased to allow suspended solids considerable time to agglomerate and settle. If, for example, a typical single family septic tank of 1000 gallons retention were used to treat the sewage of 20 homes, the retention time would be approximately 8 to 16 days. The liquid of tank 114 in the clear space between the settled and scum layers can be returned to tank 22 of the system rather than to a leach field. Such liquid will already have undergone partial decomposition by both facultative and anoxic processes. The fate of certain dissolved materials remaining in the liquid returned from tank 114 to tank 22 will differ depending on the type of filtration used in the system are summarized in Table 1.

TABLE 1

| Type of Dissolved Material | Fate with Biofilter | Fate with Other Types of Filters |
|---|---|---|
| Ammonia, urea and other organic nitrogen compounds | Nitrified to nitrate forms | Passed on to output unchanged |
| Carbohydrates | Oxidized to $H_2O$ and $CO_2$ | Passed on to output unchanged |

Ozone gas from airspace 40 of vessel 10 can enter the airspace of solids treatment system 92 to destroy $H_2S$, $CH_4$ and odors. As with a conventional septic tank, grit and other inert residual solids in the tank can be removed and disposed periodically, such as by pump truck.

A number of embodiments of the invention have been described. Nevertheless, it will be understood that various modifications may be made without departing from the spirit and scope of the invention. For example, although municipal and sanitary wastewater can serve as predominant sources of wastewater, other sources are also suitable, including fish tanks and ponds, livestock feedlots, food processing plants, lakes, rivers and streams. In addition, reverse osmosis can be used as a post treatment to the membrane separation system if water of the highest purity is desired. In embodiments, a grinder assembly can be used with the settled solids pump. Moreover, other solids treatment systems, such as a heated and mixed anaerobic digester or an autothermal thermophillic anaerobic digester (ATAD) can be used.

What is claimed is:

1. A method of treating wastewater containing settleable solids to form a reusable liquid fraction, comprising:
    separating a wastewater stream into a first component including utilizing centripetal forces created by differential flow velocities, the first component including an amount settleable solids greater than an amount of settleable solids in the second component means for creating centripetal separation forces within the vessel caused by differential flow velocities;
    applying the second component to a membrane permeable to selected ingredients of the second component; and
    concentrating the second component on a surface of the membrane to form a solids concentrate and a reusable liquid fraction.

2. The method of claim 1, wherein separating includes settling settleable solids by gravity.

3. The method of claim 2, wherein separating further includes settling settleable solids by forces generated by wastewater stream flow into a separation tank.

4. The method of claim 1, further comprising removing the solids concentrate from the membrane as a slurry fraction and returning the slurry fraction to the wastewater stream.

5. The method of claim 1, further comprising disinfecting the reusable liquid fraction.

6. The method of claim 5, wherein disinfecting includes exposing the reusable liquid fraction to ultraviolet radiation.

7. The method of claim 5, wherein disinfecting includes mixing a chemical oxidant with the reusable liquid fraction.

8. The method of claim 7, wherein the chemical oxidant includes ozone.

9. The method of claim 7, wherein disinfecting further includes exposing the reusable liquid fraction to ultraviolet radiation.

10. The method of claim 1, further comprising comminuting the wastewater stream prior to separating the first component and the second component.

11. The method of claim 1, further comprising creating high shear forces between the second component and the membrane.

12. The method of claim 1, further comprising screening the second component through a filter system prior to applying the second component to the membrane.

13. The method of claim 12, further comprising backflushing the filter system.

14. The method of claim 1, further comprising exposing the reusable liquid fraction to a fixed-film biofilter.

15. An apparatus for treating wastewater containing settleable solids comprising:
    a settleable solids separator comprising:
        a vessel having an upper end, a lower end, and an outer wall connecting the upper end and the lower end;
        an inlet directed partially tangentially through the outer wall near the upper end of the vessel; means for creating centripetal separation forces within the vessel caused by differential flow velocities;
        a first outlet proximate to the upper end of the vessel; and
        a second outlet proximate to the lower end of the vessel;
    a membrane separation system having an inlet and a permeate outlet, the inlet and the permeate outlet being separated by a membrane; and
    a fluid conduit fluidly connecting the first outlet of the settleable solids separator and the inlet of the membrane separation system.

16. The apparatus of claim 15, wherein the settleable solids separator is a vortex separator.

17. The apparatus of claim 15, further comprising a permeate conduit fluidly connecting the permeate outlet of the membrane separation system to an ozone treatment system.

18. The apparatus of claim 17, wherein the ozone treatment system includes a closed ozone treatment vessel having an ozone injection region in fluid communication with a permeate flowing region.

19. The apparatus of claim 18, further comprising an ozone transport conduit fluidly connecting a closed atmosphere of the settleable solids separator and the closed ozone treatment vessel.

20. The apparatus of claim 17, wherein the ozone treatment system includes an ultraviolet disinfection system.

21. The apparatus of claim 15, further comprising a permeate conduit fluidly connecting the permeate outlet of the membrane separation system to an ultraviolet disinfection system.

22. The apparatus of claim 15, further comprising a flow restrictor in fluid communication with the first outlet of the settleable solids separator.

23. The apparatus of claim 15, further comprising an equalization vessel between the first outlet of the separator vessel and the inlet of the membrane separation system.

24. The apparatus of claim 15, further comprising a wastewater pump in fluid communication with the inlet of the settleable solids separator.

25. The apparatus of claim 24, wherein the wastewater pump is a comminuting wastewater pump.

26. The apparatus of claim 15, further comprising a fixed-film biofilter system and a permeate conduit fluidly connecting the permeate outlet of the membrane separation system to the fixed-film biofilter system.

27. The apparatus of claim 15, further comprising a backflushable filter system in fluid communication with first outlet of the separator and the inlet of the membrane separation system.

28. The apparatus of claim 27, wherein the backflushable filter system includes filter disks.

29. An apparatus for treating wastewater containing settleable solids comprising:
    a vortex separator comprising:
        a closed separator vessel having an upper end, a lower end, and an outer wall connecting the upper end and the lower end;
        an inlet directed partially tangentially through the outer wall near the upper end of the vessel; means for creating centripetal separation forces within the vessel caused by differential flow velocities;
        a first outlet proximate to the upper end of the vessel; and
        a second outlet proximate to the lower end of the vessel;
    an ozone treatment system including a closed ozone treatment vessel having a fluid inlet and an ozone injection region in fluid communication with a fluid flowing region; and
    a fluid conduit fluidly connecting the first outlet of the vortex separator to the fluid inlet of the ozone treatment system,
    wherein the closed separator vessel and the closed ozone treatment vessel are fluidly connected by an ozone transport conduit.

* * * * *